No. 817,066. PATENTED APR. 3, 1906.
S. HUNTER.
PNEUMATIC TIRE.
APPLICATION FILED SEPT. 21, 1905.
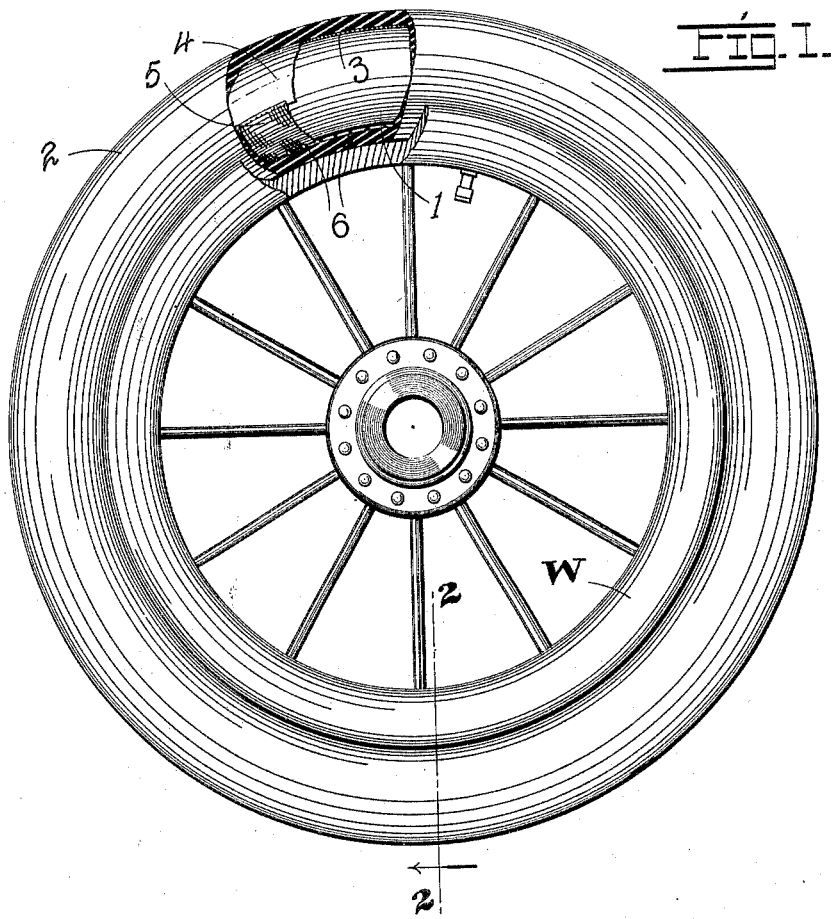
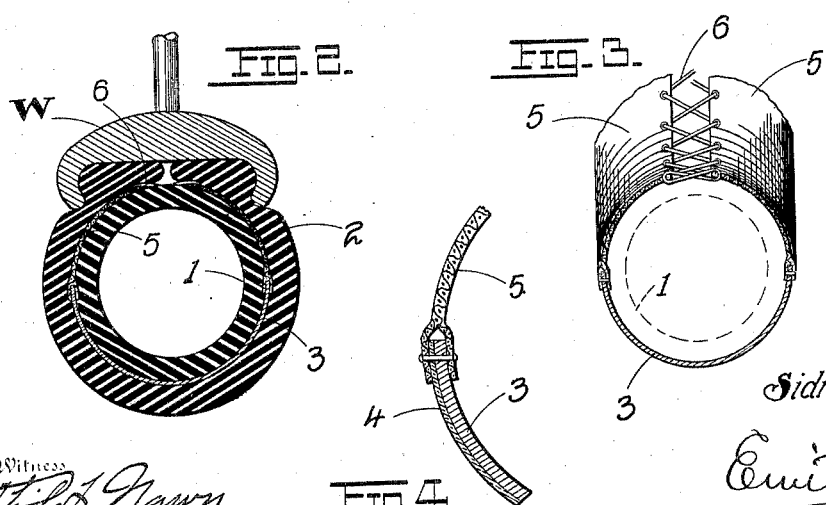

UNITED STATES PATENT OFFICE.

SIDNEY HUNTER, OF ST. LOUIS, MISSOURI.

PNEUMATIC TIRE.

No. 817,066.  Specification of Letters Patent.  Patented April 3, 1906.

Application filed September 21, 1905. Serial No. 279,435.

*To all whom it may concern:*

Be it known that I, SIDNEY HUNTER, a citizen of the United States, residing at St. Louis, State of Missouri, have invented certain new and useful Improvements in Pneumatic Tires, of which the following is a full, clear, and exact description, reference being had to the accompanying drawings, forming a part hereof.

My invention has relation to improvements in pneumatic tires; and it consists in the novel construction of tire more fully set forth in the specification and pointed out in the claim.

In the drawings, Figure 1 is a side elevation of a tire with walls broken away, showing my improvement applied thereto. Fig. 2 is a cross-section on the line 2 2 of Fig. 1. Fig. 3 is a cross-sectional detail of the intermediate reinforcing-section by which the tire is rendered puncture-proof, and Fig. 4 is an enlarged sectional detail showing the coating of enamel or glaze on the outer member of the reinforcing-section.

The object of my invention is to construct a pneumatic tire which will be practically puncture-proof, one which is light, durable, and cheap, and one possessing further and other advantages better apparent from a detailed description of the invention, which is as follows:

Referring to the drawings, W represents a vehicle-wheel of conventional design. The tire made according to my invention is composed of an inner rubber tube or section 1, an outer section or tube 2, and an inner section interposed between the parts 1 and 2. This inner section is composed of an outer metallic annular member or sheath 3, encircling the inner section 1 and embracing the outer half of its peripheral surface, the outer face of said member 3 being coated with a layer of enamel or glaze 4, Fig. 4. The glazed surface, being hard and smooth, not only resists the puncture by sharp points—such as nails, spikes, and the like—but has the property of deflecting such sharp points, so that the point will sooner slip along the glazed surface of the layer 4 than it will penetrate it and the metal of the member 3. The opposite edges of the members 3 have riveted thereto the elastic extensions 5 5, made of material similar to the braces of suspenders, whereby the extensions can be stretched around the inner section 1 and then tightly laced thereto by the lacing-strings 6, which connect the free edges of the elastic extensions 5.

A tire of the character here described is practically puncture-proof, since not only does the metal sheath 3 resist the penetrating tendency of sharp pieces of rock, nails, tacks, and the like, but the points will slip over the glazed layer 4 before they will enter the same, the smooth surface of the glaze deflecting such points to an angle at which penetration becomes impossible.

Having described my invention, what I claim is—

A pneumatic tire comprising an inner rubber section, an outer rubber section, and an intermediate section composed of an outer metal sheath encircling the inner section and embracing the outer portion of its peripheral surface, elastic extensions secured to the edges of the sheath, and suitable lacing for uniting the extensions and drawing them tightly about the inner section, substantially as set forth.

In testimony whereof I affix my signature in presence of two witnesses.

SIDNEY HUNTER.

Witnesses:
 EMIL STAREK,
 MARY D. WHITCOMB.